Patented Jan. 8, 1924.

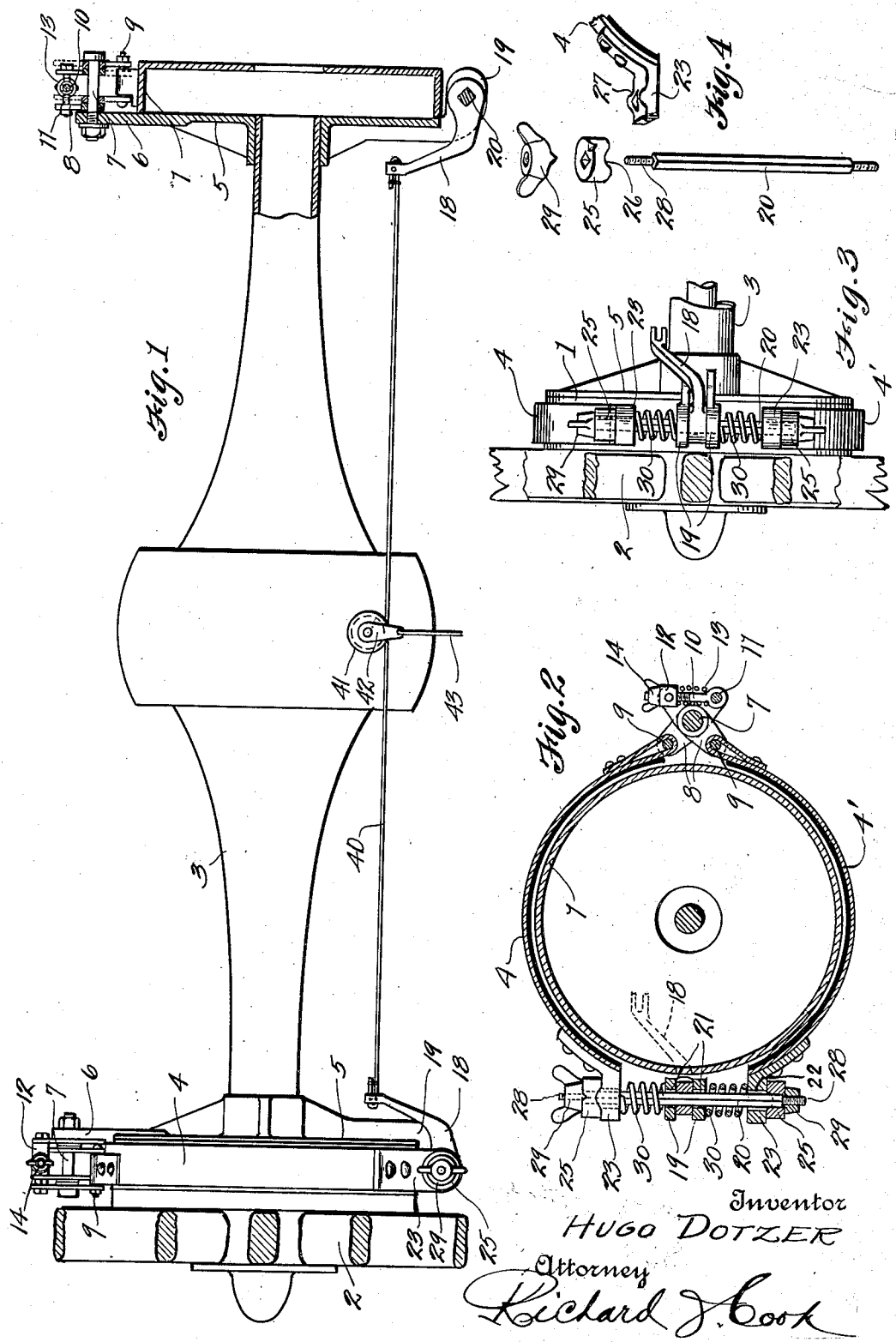

1,480,050

UNITED STATES PATENT OFFICE.

HUGO DOTZER, OF SEATTLE, WASHINGTON.

BRAKE MECHANISM.

Application filed January 9, 1922. Serial No. 528,029.

*To all whom it may concern:*

Be it known that I, HUGO DOTZER, a citizen of the United States, and a resident of the city of Seattle, county of King, State of Washington, have invented certain new and useful Improvements in Brake Mechanism, of which the following is a specification.

This invention relates to improvements in brake mechanism, and more particularly to brakes of that type used on the driving wheels of automobiles, and which are known as exterior, contracting brakes.

The principal object of this invention is to provide an external brake mechanism which may be used on trucks, automobiles, trailers, etc., which has no fixed connection with the vehicle body, which is easily adjustable and can be removed without the necessity of first removing of the vehicle wheel to which it is applied.

Another object of the invention resides in the means for adjusting the tension of the brake band sections.

In accomplishing these and other objects of the invention, I have provided the improved details of construction the preferred forms of which are illustrated in the accompanying drawings, wherein—

Figure 1 is a plan view of an axle and brake mechanism mounted thereon, according to the present invention; one of the drums being shown in section for better illustration.

Figure 2 is a partial sectional view of a brake assembly, taken in a plane that is perpendicular to the axial line of the brake drum.

Figure 3 is a front view of one of the brake assemblies.
Figure 4 is a perspective view of a set of brake control parts in disassembled relation.

Referring more in detail to the drawings—
The present brake mechanism employs the usual brake drums 1 which are secured to the interior faces of the vehicle wheels, designated at 2, at opposite ends of the axle housing 3. About these drums are fitted two, cooperating semi-circular brake band sections 4—4' which are equipped with the usual lining, and are supported in operative, functional position from cover plates 5 provided for the drums and which are secured to the opposite ends of the non-rotatable axle housing 3.

At the back edge of each drum cover plate, is a rearwardly projecting portion 6 wherein pivot bolts 7 are mounted, and pivotally supported on each of these bolts are two pairs of crossed levers 8 as shown best in Figure 2. Pins 9 are removably mounted to extend between the inner ends of each pair of levers and the rearward ends of the two brake band sections 4—4' are looped about these pins and thereby joined thereto. At their outer ends the paired levers are connected by means of an adjusting bolt 10 that is secured at its lower end to a pin 11 that extends between the lower ends of the set of levers 8 with which the band 4 is connected, and is slidable at its upper end through a block 12 to which the upper ends of the other set of levers is secured. A spring 13 is mounted about the bolt which bears against the block 12 and pin 11 to urge them apart, and a wing nut 14 is threaded onto the outer end of the bolt whereby the spreading movement of the links is limited. By adjustment of the nut 14, the bands 4—4' are adjusted with respect to the drum.

The means employed for actuating the brake bands into braking contact with the drums comprises levers 18 that are pivotally mounted between spaced apart wings 19, extending forwardly from the drum cover plates 5. These levers are fixed upon squared shafts 20 that extend vertically, and revolubly through alined apertures 21 in said flanges, and also through apertures 22 in shoes 23 that are fixed to the forward ends of the two brake band sections, as is shown in Figure 2.

Mounted on the opposite ends of the shafts 20 to turn therewith, are cam heads 25 provided with cam surfaced sockets 26 adapted to coact with cam faces 27 on the shoes 23, so that, upon turning the shafts by means of the levers, the bands will be caused to be tightened against the brake drum. In this construction, the levers and cam heads are designed for the most effective operation, and the openings through the brake band heads and through the wings 19 are circular, in order to permit the shafts 20, which are square, to turn therein. The ends of these shafts terminate in threaded end portions 28 whereon thumb nuts 29 are mounted to engage the heads 25 to hold the parts in functional relation, and coiled springs 30 are mounted about the shafts between the wings 19 and shoes 23 to urge the brake band sections normally from braking contact with the drums.

The means for actuating, and through which an equalized braking force is automatically placed on the two mechanisms, consists of a cable 40 which connects the ends of the brake levers 20. This cable is drawn taut, and mounted to move along the same is a pulley 41 mounted in a block 42 to which a cable 43 is attached; the latter being extended forwardly to any suitable control mechanism. With the two brake mechanisms so constructed and connected, it is apparent that tension on the cable 43 will be transmitted to the cable 40 and thence to the brake levers.

It is also apparent that should it require one brake lever to move in a greater arc before the brake bands become effected than is required by the opposite lever, the pulley will automatically shift itself toward the lever which moves in the greater arc and will, in this way, equalize the tension on the two levers and their brake bands.

It is also apparent that, in this construction, no parts of the brake mechanism are attached to the sectional frame, but all are mounted on the drum cover and have no movement relative to the frame, and a constant adjustment may be maintained regardless of the load that may be placed on the vehicle.

Having thus described my invention, what I claim as new therein and desire to secure by Letters Patent is:

1. In a brake mechanism of the class described, the combination with a brake drum and a stationary cover therefor, of a pair of brake bands having adjacent ends pivotally connected with the cover, cam shoes at the other ends of said bands provided with alined apertures, a shaft extended rotatably through said apertures, cam heads fixed on the ends of said shaft to operatively engage the said shoe, a shaft rotating arm slidable thereon, and an arm support extended from the cover.

2. In a brake mechanism of the class described, the combination with a brake drum and a stationary cover therefor having wings projecting in spaced relation at one edge thereof, with vertically alined apertures therein, a pair of brake band sections having ends pivotally supported from the cover, and having cam shoes at their other ends disposed on opposite sides of said wings and having apertures therethrough alined with the wing apertures, a square shaft extended rotatably through said wing and cam shoe apertures, cam heads fixed adjustably on the outer ends of the shaft to operatively engage the said shoes, and a shaft rotating lever fitted between the said wings and slidable on said squared shaft.

3. In a brake mechanism of the class described, the combination with a brake drum, a non-rotative cover therefor, a pair of brake bands fitted to the drum and actuating mechanism connected with adjacent ends of said bands, of an adjusting mechanism comprising members supported from the cover, and having connection with the ends of the brake bands, and an adjusting means for retaining said members at set positions.

4. In a brake mechanism of the class described, the combination with a brake drum, a non-rotative cover therefor, a pair of brake bands fitted to the drum and actuating mechanism connected with adjacent ends of said bands, of an adjusting mechanism comprising members arranged in crossed relation upon a pivotal support extended from the cover member, said members having ends connected with the two opposite brake bands and an adjustable connection at their opposite ends.

5. In a brake mechanism of the class described, the combination with a brake drum, a non-rotative cover therefor and a pair of brake bands fitted to the drum of an adjusting mechanism for said bands comprising a supporting member fixed in the cover plate, crossed links supported pivotally on said member, having inner ends pivotally connected with opposite brake bands, an adjusting bolt extended between the outer ends of the links, and a yieldable means for retaining the links in spaced relation.

6. A brake mechanism of the character described, comprising in combination, a vehicle wheel having a brake drum secured thereto, a non-rotative cover plate for the drum having spaced apart wings projecting beyond its periphery at one edge and provided with alining apertures therethrough, of a pair of brake bands having adjacent ends pivotally supported from the cover plate and having shoes secured to their other ends disposed on opposite sides of the said wings; said shoes having cam faces on their outer sides and having apertures therethrough in alinement with the wing apertures, a squared shaft extending revolubly through said wing and shoe apertures, cam heads mounted on the ends of said shaft engageable with the cam faces of said shoes whereby the latter will be actuated inwardly on revolving the shaft, nuts mounted on the outer ends of said shaft to effect and retain adjustment of the cams, a lever mounted on the shaft between the wings operable to rotate the shaft to actuate the bands against the drum and compression springs mounted between the wings and band shoes to urge the bands from the drum.

7. A brake mechanism of the character described, comprising in combination, a vehicle wheel having a brake drum secured thereto, a non-rotative drum cover plate having an extension projecting beyond the periphery of the drum, a bolt mounted in the said extension, two sets of paired levers centrally pivoted upon the bolt in crossed relation, a pair of brake band sections mounted to engage opposite sides of the drum and having ends pivotally fixed between the inner ends of paired levers, a block pivotally mounted between the outer ends of one set of links, a pin extending between the ends of the opposite set, a bolt having an end pivotally attached to said pin and extending slidably through said block, a nut on the outer end of said bolt adjustable to limit the spread of the levers and a spring mounted on the bolt between the pin and block to urge the levers to retain the brake bands normally disengaged from the drum, and means at the opposite ends of the bands for drawing the same to braking contact with the drum.

8. A brake mechanism of the character described, comprising in combination, a brake drum, a non-rotative cover plate for the drum having a peripheral extension at its rearward edge and having spaced apart wings projecting from its forward edge, having alined apertures therein, a pair of brake band sections mounted to engage opposite faces of the drum, a bolt mounted in the rearward projecting portion of the cover plate, two sets of paired levers centrally pivoted upon the bolt in crossed relation and secured at their inner ends to the brake bands, a block pivotally mounted between the ends of one set of levers, a pin extending between the ends of the other set, a bolt having one end pivotally attached to said pin and extending slidably through said block, an adjustable nut on the outer end of said bolt for adjusting the spread of the levers, shoes secured to the forward ends of the brake band sections on opposite sides of said wings; said shoes having cam faces on their outer sides and having apertures therethrough in alinement with the wing apertures, a shaft extending revolubly through said wing and shoe apertures, cam heads mounted adjustably on the outer ends of the shaft to engage cam faces of said shoes and a lever fixed on the shaft between the wings, whereby the shaft may be rotated for the purpose set forth.

Signed at Seattle, Washington this 3rd day of January, 1922.

HUGO DOTZER.